June 5, 1962 B. M. GORDON 3,038,130
FREQUENCY SENSITIVE APPARATUS
Filed April 7, 1958
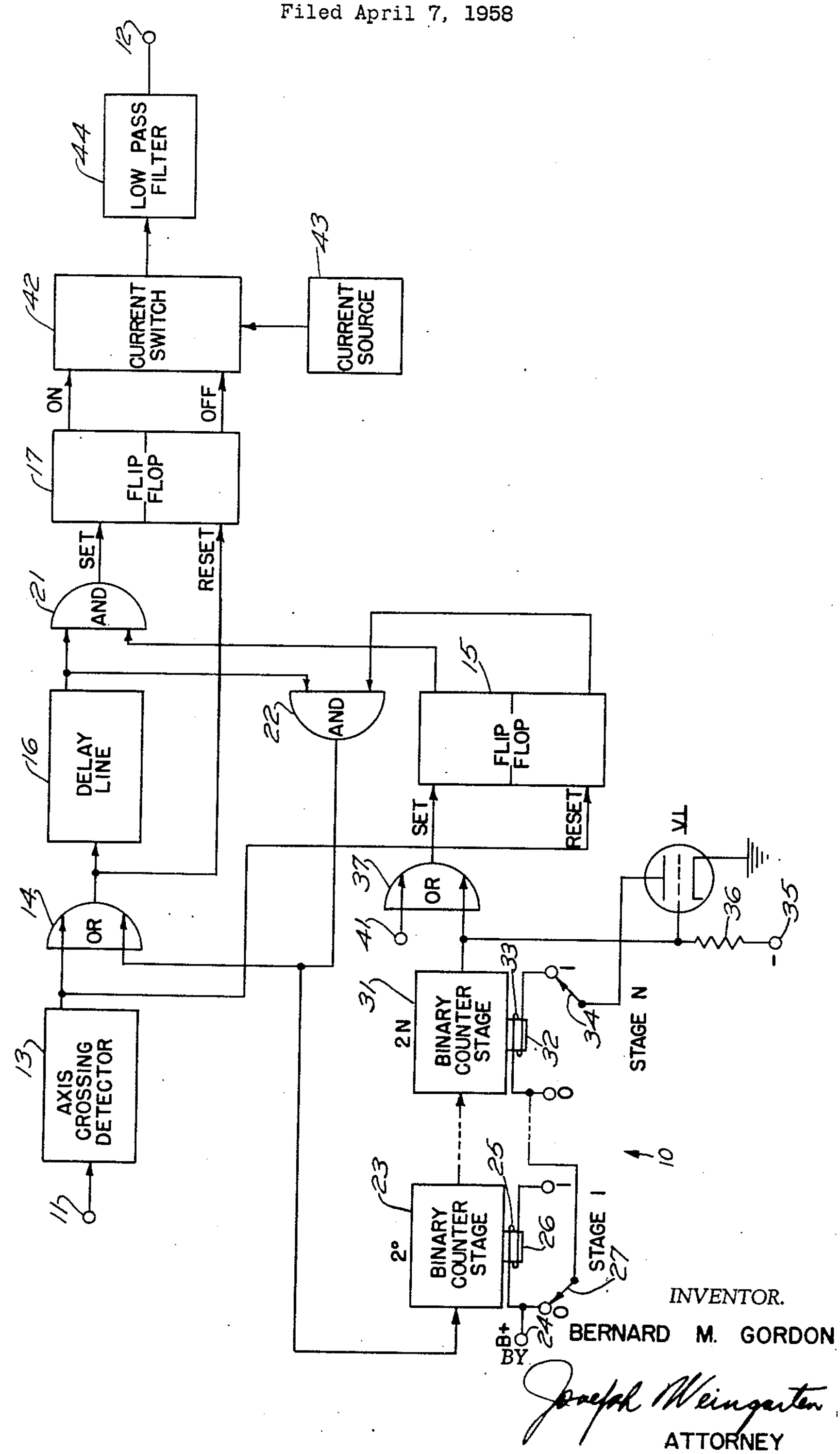
INVENTOR.
BERNARD M. GORDON
BY
Joseph Weingarten
ATTORNEY United States Patent Office 3,038,130 Patented June 5, 1962

3,038,130

FREQUENCY SENSITIVE APPARATUS

Bernard M. Gordon, Newton, Mass., assignor to Epsco, Incorporated, Boston, Mass., a corporation of Massachusetts Filed Apr. 7, 1958, Ser. No. 726,868
7 Claims. (Cl. 332—9)

The present invention relates in general to frequency discriminators and more particularly concerns a novel system for providing an output signal accurately representative of the frequency deviation of frequency-modulated subcarriers having center frequencies extending over a relatively broad portion of the frequency spectrum. The accuracy, stability and other advantages obtained with the systems disclosed in the copending application of Bernard M. Gordon, entitled Frequency Detecting Unit, Serial No. 584,802, filed May 14, 1956, now abandoned and Frank M. Young, Bernard M. Gordon and Sherman Rigby entitled Frequency Discriminator, Serial No. 634,634, filed January 17, 1957, now Patent No. 2,961,611, are achieved with but a single precision delay line in a delay circuit which in accordance with the desired discriminator center frequency selectively controls the number of times an input signal is recirculated through the precision delay line.

In the discriminators described in the aforesaid copending applications, the state of a bistable circuit is governed by signals applied from an axis crossing detector directly and after a prescribed delay. The delay is approximately 50% to 90% of the period of the input signal center frequency for best operation. In practical telemetering systems having a number of frequency-modulated subcarriers, the subcarrier center frequencies extend over a relatively wide portion of the frequency spectrum. In order to achieve the advantage of the above-mentioned techniques, different precise delays must be furnished for demodulating each subcarrier.

Generally, the cost of precision delay lines, such as quartz delay lines, increases with the required delay. Moreover, it is inconvenient and uneconomical to build discriminators which may be used over only a small portion of the frequency spectrum encompassing the subcarrier center frequencies.

The present invention contemplates and has as a primary object the provision of a frequency discriminator for converting the deviation of an input signal from a prescribed center frequency to an accurately characteristic output signal magnitude regardless of the position in the frequency spectrum of the center frequency.

It is an object of the invention to provide a frequency discriminator in accordance with the preceding object employing a single precision delay line furnishing a relatively short delay to minimize equipment costs without sacrificing range and accuracy.

It is another object of the invention to provide a frequency discriminator in accordance with the preceding objects capable of being rapidly transferred from responding to one subcarrier to another deviated about a different center frequency.

Still another object of the invention is the provision of a frequency discriminator especially suitable for accurately indicating in sequence the instantaneous frequency of a number of different subcarriers.

According to the invention, signals from an axis crossing detector are applied directly and through a delay circuit to a bistable circuit which controls the duration of current pulses of precisely controlled amplitude. The average value of the current pulses characterizes the frequency of a subcarrier applied to the axis crossing detector. The aforesaid application entitled "Frequency Discriminator," contains a discussion of the average value of the current pulses and its relation to the frequency of the input signal applied to an axis crossing detector. The delay circuit comprises a precision delay line for recirculating input signals from the axis crossing detector a number of times controlled by a counter preset to a count related to the center frequency of the applied subcarrier, the recirculated signal stepping the counter upon being recirculated. When the counter is full, the recirculated signal is applied to the bistable circuit and the counter reset to the preset count. Means are provided for rapidly changing this preset count.

Other features, objects and advantages of the invention will become apparent from the following specification when read in connection with the accompanying drawing, the single figure of which shows a combined block-schematic circuit diagram of the novel discriminator.

With reference to the drawing, the discriminator is shown with a magnetic core counter 10 and means for presetting the counter in accordance with the subcarrier center frequency. The frequency modulated subcarrier signal is applied on terminal 11 and an output potential, indicative of the subcarrier instantaneous frequency, provided on output terminal 12.

Before discussing the mode of operation, the physical arrangement of the system will be described. An axis crossing detector 13 energizes buffer 14 and the reset input of flip-flop 15. The output of buffer 14 is coupled to the input of delay line 16 and the reset input of flip-flop 17. The output of delay line 16 is coupled to one input of gates 21 and 22. The other inputs of gates 21 and 22 are coupled to respective outputs of flip-flop 15. The output of gate 21 is coupled to the set input of flip-flop 17. The output of gate 22 is coupled to a second input of buffer 14 and to the input of the first counter stage 23. A source of direct potential on terminal 24 is connected to one end of the first stage preset winding 25 on the first stage core 26. A switch 27 connects a selected end of winding 25 to one end of the following stage preset winding. The output of stage 23 is coupled to the input of the following stage. The input of the *n*th stage 31 having a core 32 is coupled to the output of the preceding stage. One end of the preset winding 33 of this stage is connected to a preset switch selecting one end of the preset winding in the preceding stage. Switch 34 connects a selected end of preset winding 33 to the plate of tube V1. The cathode of tube V1 is grounded and its grid connected to a negative potential on terminal 35 through resistor 36 biasing tube V1 beyond cutoff. The output of stage 31 is coupled to the grid of tube V1 and to the set input of flip-flop 15 through buffer 37. Buffer 37 also couples terminal 41 to the set input of flip-flop 15.

Respective outputs of flip-flop 17 are coupled to On and Off inputs of current switch 42 which couples current from current source 43 to low pass filter 44. Current source 43 provides a constant current to switch 42 when that switch is On. Current source 43 may be any source whose internal resistance is high relative to the impedance of its external load so that fluctuations in load impedance do not effect an appreciable change in current. A suitable current source is described in the aforesaid application entitled "Frequency Discriminator." Filter 44 provides the output potential on terminal 12.

Operation is as follows:

Axis crossing detector 13 responds to one axis crossing per cycle of the subcarrier signal applied on terminal 11 by providing an output pulse which resets flip-flop 15 to respectively decondition and condition gates 21 and 22. This output pulse is also coupled to the input of delay line 16 through buffer 14. Since gates 21 and 22 are respectively deconditioned and conditioned, the delayed pulse is only passed by gate 22 and coupled to the input of delay line 16 through buffer 14 for recirculation. The output pulse from gate 22 is also applied to the input of the first binary counter stage 23 to advance the count by one.

The counter is preferably a tube-magnetic core counter or a transistor-core counter wherein each core has an additional winding for presetting the core to a selected bistable state corresponding to the binary value of the associated digit in the binary number it is desired to preset in the counter in accordance with the subcarrier center frequency.

This number is selected by moving the respective preset switches to the Zero or One position, depending on the value of the corresponding digit. When a switch is in the Zero position, the plate current drawn by tube V1, when rendered conductive, bypasses the associated winding and the core remains in the Zero state. In the One position, the plate current of tube V1 passes through the associated winding, thereby setting the corresponding core to the One state. Preset switches 27 and 34 are shown in Zero and One position, respectively.

Thus, each time a pulse emerges from gate 22, the count in the counter is advanced by one until the core in each stage resides in the One state. The next pulse causes each binary counter stage to return to the Zero state and a carry pulse to be ejected from the last counter stage 31. The carry pulse is coupled through buffer 37 to set flip-flop 15, thereby conditioning and deconditioning gates 21 and 22, respectively. The carry pulse is also applied to the grid of normally non-conductive tube V1, rendering it conductive, thereby establishing the One state in those cores having an associated preset switch in the One position.

The next pulse from delay line 16 is then passed through gate 21 to set flip-flop 17, thereby establishing current switch 42 in the On state whereby the current from current source 43 is passed to low pass filter 44. The next pulse from axis crossing detector 13 then resets flip-flops 15 and 17. Gates 21 and 22 are thereby deconditioned and conditioned, respectively, and current switch 42 is returned to the Off state, terminating the flow of current to low pass filter 44.

The duration of each current pulse energizing low pass filter 44 for an N stage counter is $(2^N+1-P)Tf$ where T is the delay furnished by delay line 16 and $f$ is the instantaneous frequency of the input signal applied to terminal 11. The output potential on terminal 12 is $$ZI[1-(2^N+1-P)Tf]$$

where Z is the magnitude of the transfer impedance of low pass filter 44 and I is the magnitude of the current supplied by current source 43.

It is generally desired that $(2^N+1-P)Tf_{UL}$ be a prescribed fraction, $p$, where $f_{UL}$ is the upper limit frequency of a subcarrier channel.

From this relation, the preset number P may be determined, thus:

$$P=\frac{(2^N+1)Tf_{UL}-p}{Tf_{UL}}$$

The preset binary number corresponding most nearly to P may be inserted into the counter by appropriately setting the preset switches.

In a representative embodiment of the invention, high resolution in current pulse to voltage conversion is obtained with P substantially equal to 0.9 for any one of the 23 IRWTG subcarrier channels, using an eight stage binary counter and a quartz delay line having a nine microsecond delay. For IRWTG channel 12, $f_{UL}$ is 11.28 kc., corresponding to a period of approximately 89 microseconds. The multiple of none microseconds which best approximates 90 percent of this is 81 microseconds, or actually 90.6 percent thereof. Thus, by making the axis crossover pulse pass through delay line 16 nine times before being passed by gate 21, current pulses of the desired duration are produced for IRWTG channel 12.

The preset switches may be selected manually or automatically from remote or local positions. Different preset counters may be used to control the recirculation. Numerous other modifications of and departures from the specific embodiment described herein may be practiced by those skilled in the art without departing from the inventive concepts. Consequently, the invention is to be construed as limited only by the spirit and scope of the appended claims.

What is claimed is:

1. A delay circuit comprising, a source of input signals, a delay line furnishing a fixed delay between its input and output, means for coupling each input signal to said delay line input, means for coupling said delay line output to said delay line input to recirculate each input signal through said delay line, a counter energized by delayed signals from said delay line output for providing an output signal in response to a predetermined number of delayed signals, an output terminal, and switching means responsive to said counter output signal for coupling and decoupling said delay line output to said output terminal and from said delay line input, respectively.

2. A delay circuit in accordance with claim 1 wherein said switching means responds to the next input signal following said counter output signal by decoupling and coupling said delay line output from said output terminal and to said delay line input, respectively.

3. A delay circuit in accordance with claim 2 and further comprising, selecting means for determining said predetermined number, and means controlled by said selecting means for establishing a preset count in said counter corresponding to said predetermined number in response to said counter output signal.

4. A delay circuit in accordance with claim 3 wherein said counter includes a plurality of cascaded binary stages each having a magnetic core assuming one of two stable states characteristic of first and second values of binary digits, said selecting means includes a preset winding on each core, and said preset count is established by energizing those windings associated with stages related to digits in the binary representation of said preset count having said first value.

5. A delay circuit comprising, a source of input signals, a delay line furnishing a fixed delay between its input and output, a buffer coupling said signal source to said delay line input, an output terminal, first and second gates respectively coupling said delay line output to said output terminal and the input of said buffer when conditioned, a flip-flop conditioning said first gate when set and said second gate when reset, a counter providing an output pulse for setting said flip-flop in response to a predetermined number of input pulses, the output of said second gate also being coupled to the input of said counter, and means for coupling said signal source to said flip-flop whereby the latter is reset by the first input signal occurring after said counter output pulse.

6. Frequency sensitive apparatus comprising, a source of an input signal, means for deriving axis crossing pulses in response to axis crossings of said input signal, a precision delay line furnishing a fixed delay between its input and output, a delay circuit output terminal, means for repetitively circulating each axis crossing pulse a predetermined number of times through said delay line and then providing each pulse on said delay circuit output terminal, a current source, an output terminals, and a current switch responsive to each axis crossing pulse and each pulse provided on said delay circuit output terminal for selectively coupling said current source to said output terminal.

7. Frequency sensitive apparatus comprising, a source of an input signal, means for deriving axis crossing pulses in response to axis crossings of said input signal, a delay line furnishing a fixed delay between its input and output, a buffer coupling said axis crossing pulses to said delay line input, a delay circuit output terminal, first and second gates respectively coupling said delay line output to said delay circuit output terminal and the input of said buffer when conditioned, a flip-flop conditioning said first gate when set and said second gate when reset, a counter providing an output pulse for setting said flip-flop in response to a predetermined number of input pulses, the output of said second gate also being coupled to the input of said counter, means for selecting a predetermined count, means responsive to said counter output pulse for initially establishing said count in said counter, a current source, an output terminal, and a current switch responsive to delayed signal pulses provided on said delay circuit output terminal and said axis crossing pulses for selectively coupling said current source to said output terminal.

References Cited in the file of this patent

UNITED STATES PATENTS

| | | |
|---|---|---|
| 2,558,448 | MacSorley | June 26, 1951 |
| 2,724,780 | Harris | Nov. 22, 1955 |
| 2,736,021 | Sunstein | Feb. 21, 1956 |
| 2,738,463 | Metzger | Mar. 13, 1956 |
| 2,803,818 | Byrne | Aug. 20, 1957 |